United States Patent Office 3,541,097
Patented Nov. 17, 1970

1

3,541,097
PROCESS FOR THE PRODUCTION OF COUMARIN DERIVATIVES
Rudi Beyerle, Bruchkobel, Kreis Hanau, and Adolf Stachel, Rolf-Eberhard Nitz, and Klaus Resag, Frankfurt am Main-Fechenheim, Germany, assignors to Cassella Farbwerke Mainkur Aktiengesellschaft, Frankfurt am Main-Fechenheim, Germany, a company of Germany
No Drawing. Filed Jan. 2, 1968, Ser. No. 694,864
Claims priority, application Germany, Jan. 7, 1967, C 41,146; Nov. 3, 1967, C 43,731
Int. Cl. C07d 51/70
U.S. Cl. 260—268
9 Claims

ABSTRACT OF THE DISCLOSURE

This disclosure describes new and useful pharmaceutical products particularly useful as coronary dilators and methods for their preparation. They can be designated as coumarin derivatives having the formula

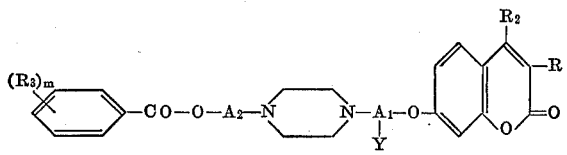

wherein $R_1$ stands for hydrogen, allyl, lower alkyl, dialkyl-aminoalkyl, where alkyl in each case contains 1–4 carbon atoms, and whereby the alkyl groups attached to the nitrogen form a piperidine ring, $R_2$ stands for hydrogen, lower alkyl or phenyl, and $A_1$ and $A_2$ are straight or branched alkylene residues having 2–4 carbon atoms, and Y is hydrogen, a hydroxy group or the residue

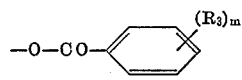

and $R_3$ stands for lower alkoxy where the alkyl contains 1–4 carbon atoms, and $m$ represents the integer 1, 2 or 3.

---

The present invention relates to new pharmacologically valuable coumarin derivatives and processes for their manufacture. These new coumarin derivatives have the general formula

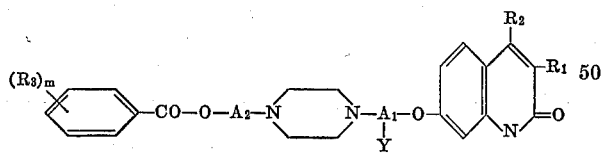

wherein $R_1$ means hydrogen, lower alkyl, allyl, dialkyl-aminoalkyl where the alkyl contains 1–4 carbon atoms, and whereby the alkyl groups attached to the nitrogen atom may form a piperidine ring, $R_2$ stands for hydrogen, lower alkyl or phenyl, $R_3$ stands for lower alkoxy where the alkyl contains 1–4 carbon atoms, $m$ represents the integer 1, 2 or 3, $A_1$ and $A_2$ are straight or branched alkylene residues having 2–4 carbon atoms and Y is hydrogen, a hydroxy group or the residue

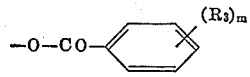

The new coumarin derivatives are obtained—
(a) By acylating, possibly in the presence of an acid-binding agent, coumarin derivatives of the general formula

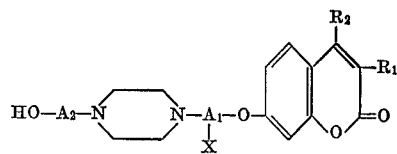

wherein X stands for hydrogen or a hydroxy group, with an alkoxy benzoic acid of the general formula

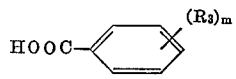

or with a functional derivative of this acid, or
(b) By condensing, possibly in the presence of an acid-binding agent, coumarin derivatives of the general formula

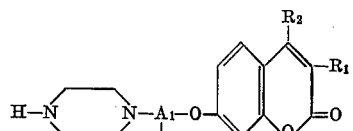

with an alkoxy benzoic acid haloalkyl ester of the general formula

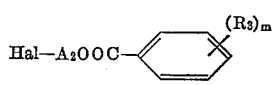

wherein Hal stands for a halogen atom, or
(c) By reacting, possibly in the presence of an acid-binding agent, 7-hydroxy-coumarin derivatives of the general formula

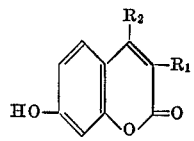

with a piperazine derivative of the general formula

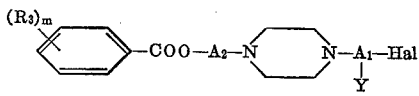

wherein Hal stands for a halogen atom, or
(d) By reacting coumarin derivatives of the general formula

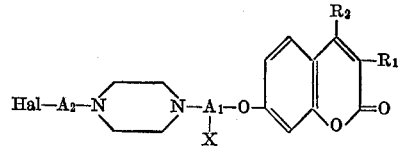

wherein Hal stands for a halogen atom, with an alkali metal salt of an alkoxy benzoic acid of the general formula

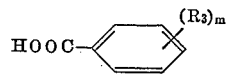

As low molecular alkyl radicals $R_1$ and $R_2$ and as alkoxy radicals $R_3$ are used particularly those having 1–4 carbon atoms.

If starting products are used in which the intermediate member $A_1$ does not contain any hydroxy groups, the claimed process yields the corresponding monoesters and if a hydroxy group is present, it yields mono and diesters. In the latter case monoesters are obtained if coumarin starting materials are acylated with 1 mol alkoxy benzoic acid or the functional derivative; the corresponding diesters are obtained if 2 moles of the latter are used. If diesters are prepared, the esterification may also be done in two steps, whereby in either step various alkoxy benzoic acids or their functional derivatives may be used as acylating agents. This technique permits the preparation of mixed diesters that contain two different acyl radicals. Also process (c) of the present invention yields both the corresponding mono and diesters which is dependent upon the meaning of the substituent Y in the piperazine derivative used as starting material. When operating according to the condensation process (b) and to process (d) of the present invention, only monoesters are obtainable, which, however, may also be converted into diesters according to the esterification process (a) by means of a second mol of the acylating agent, provided the intermediate member $A_1$ contains a hydroxy group capable of acylation.

The coumarin derivatives of the present invention are the coronary venous blood. This oxygen tension was measured according to polarographic methods by means of a platin electrode of the Gleichmann-Lübbers type (see U. Gleichmann and D. W. Lübbers "Die Messung des Sauerstoffdruckes in Gasen und Flüssigkeiten mit der Platin-Elektrode unter besonderer Berücksichtigung der Messung im Blut," Pflügers Arch. 271, 431–455 (1960)). The heart rate was continuously measured by electronic methods from systolic peaks of the arterial blood pressure. The arterial blood pressure was measured in the known manner in the femoral artery with the aid of an electromanometer of the Stratham-strain-gauge type.

The following table gives the results of the pharmacological investigations which were carried through. The preparations were tested in the form of their respective dihydrochlorides:

| Preparation | Dosage, mg./kg., i.v. | Maximal increase in oxygen tension in the coronary veinous blood | | Maximal change in the heart rate | | Maximal change in the blood pressure | |
|---|---|---|---|---|---|---|---|
| | | In percent | In minutes | In percent | In minutes | In percent | In minutes |
| 4-methyl-7-{β-[4'-(β-3'',4'',5''-trimethoxybenzoxyethyl)-piperazino[1']]-ethoxy}-coumarin. | 1.0 | +82 | 20 | +30 | | −19 | |
| 4-methyl-7-{β-[4'-(γ-3'',4'',5''-trimethoxybenzoxypropyl)-piperazino[1']]-ethoxy}-coumarin. | 2.0 | +58 | >100 | +16 | | −40 | |
| 4-methyl-7-{β-[4'-(β-3'',4'',5''-trimethoxybenzoxypropyl)-piperazino[1']]-ethoxy}-coumarin. | 2.0 | +130 | >45 | −22 | >45 | −31 | >45 |
| 3-n-butyl-4-methyl-7-{β-[4'-(β-3'',4'',5''-trimethoxybenzoxyethyl)-piperazino[1']]-ethoxy}-coumarin. | 2.0 | +87 | 30 | +2 | | −17 | |
| 3-n-butyl-4-methyl-7-{β-[4'-(β-3'',4'',5''-trimethoxybenzoxypropyl)-piperazino[1']]-ethoxy}-coumarin. | 2.0 | +76 | >60 | −24 | >60 | −9 | 3 |
| 3-n-butyl-4-n-propyl-7-{γ-[4'-(β-3'',4'',5''-trimethoxybenzoxyethyl)-piperazino[1']]-propoxy}-coumarin. | 1.0 | +52 | 20 | −11 | >20 | −23 | >15 |
| 3-ethyl-4-phenyl-7-{γ-[4'-(β-3,''4'',5''-trimethoxybenzoxyethyl)-piperazino[1']]-propoxy}-coumarin. | 2.0 | +80 | 60 | +2 | 3 | | |
| 3-ethyl-4-phenyl-7-{γ-[4'-(β-3'',4'',5''-trimethoxybenzoxypropyl)-piperazino[1']]-propoxy}-coumarin. | 2.0 | +74 | 40 | +8 | 10 | −24 | >40 |
| 3-allyl-4-methyl-7-{γ-[4'-(β-3'',4'',5''-trimethoxybenzoxyethyl)-piperazino[1']]-propoxy}-coumarin. | 2.0 | +41 | 41 | −22 | 40 | −46 | 40 |
| 3-allyl-4-methyl-7-{γ-[4'-(β-3'',4'',5''-trimethoxybenzoxypropyl)-piperazino[1']]-propoxy}-coumarin. | 2.0 | +56 | 40 | −41 | 30 | −38 | 40 |
| 4-methyl-7-{γ-[4'-(β-3'',4'',5''-trimethoxybenzoxypropyl)-piperazino-[1']]-β-3'',4'',5''-trimethoxybenzoxypropoxy}-coumarin. | 2.0 | +44 | 20 | −12 | 16 | −19 | 2 |
| 3-n-butyl-4-n-propyl-7-{γ-[4'-(β-3'',4'',5''-trimethoxybenzoxyethyl)-piperazino[1']]-β-3'',4'',5''-trimethoxybenzoxypropoxy}-coumarin. | 2.0 | +57 | >30 | −34 | >30 | −32 | >30 |
| 3-ethyl-4-phenyl-7-{γ-[4'-(β-3'',4'',5''-trimethoxybenzoxypropyl)-piperazino[1']]-β-3'',4'',5''-trimethoxybenzoxypropoxy}-coumarin. | 2.0 | +58 | 40 | −14 | >40 | −26 | >40 |
| 3-allyl-4-methyl-7-{γ-[4'-(β-3'',4'',5''-trimethoxybenzoxyethyl)-piperazino[1']]-β-3'',4'',5''-trimethoxybenzoxypropoxy}-coumarin. | 2.0 | +91 | 30 | −16 | >50 | −26 | 45 |
| 3-allyl-4-methyl-7-{γ-[4'-(β-3'',4'',5''-trimethoxybenzoxypropyl)-piperazino[1']]-β-3'',4'',5''-trimethoxybenzoxypropoxy}-coumarin. | 2.0 | +49 | 35 | −9 | >35 | −39 | 40 |
| 3-β-diethylamino-ethyl-4-methyl-7-{γ-[4'-(γ-3'',4'',5''-trimethoxybenzoxypropyl)-piperazino[1']]-β-3'',4'',5''-trimethoxybenzoxypropoxy}-coumarin. | 2.0 | +70 | 30 | +15 | >30 | −16 | 5 |
| 3-β-diethylamino-ethyl-4-methyl-7-{γ-[4'-(β-3'',4'',5''-trimethoxybenzoxypropyl)-piperazino[1']]-β-3'',4'',5''-trimethoxybenzoxypropoxy}-coumarin. | 2.0 | +94 | 35 | −10 | >40 | −46 | 10 |
| 3-β-diethylamino-ethyl-4-methyl-7-{γ-[4'-(γ-3'',4'',5''-trimethoxybenzoxybutyl)-piperazino[1']]-β-3'',4'',5''-trimethoxybenzoxypropoxy}-coumarin. | 2.0 | +90 | 30 | −7 | >30 | −21 | 20 |
| 3-β-N-piperidino-ethyl-4-n-propyl-7-{γ-[4'-(β-3'',4'',5''-trimethoxybenzoxyethyl)-piperazino-[1']]-β-3'',4'',5''-trimethoxybenzoxypropoxy}-coumarin. | 2.0 | +116 | 40 | −11 | 10 | −35 | 5 |
| 3-β-N-piperidino-ethyl-4-n-propyl-7-{γ-[4'-(γ-3'',4'',5''-trimethoxybenzoxypropyl)-piperazino[1']]-β-3'',4'',5''-trimethoxybenzoxypropoxy}-coumarin. | 2.0 | +48 | 30 | +8 | 3 | −23 | 10 |
| 3-n-butyl-4-n-propyl-7-{γ-[4'-(β-3'',4'',5''-trimethoxybenzoxypropyl)-piperazino[1']]-β-3'',4'',5''-trimethoxybenzoxypropoxy}-coumarin. | 2.0 | +76 | 40 | −14 | >40 | −24 | >40 |
| 3-n-butyl-4-n-propyl-7-{γ-(4'-(γ-3'',4'',5''-trimethoxybenzoxybutyl)-piperazino[1']]-β-3'',4'',5''-trimethoxybenzoxypropoxy}-coumarin. | 1.0 | +50 | 55 | −52 | | −10 | | valuable pharmaceutics. In particular they are excellent coronary dilators and, in this respect, superior to other known substances having such properties. Their salts are colorless, crystalline substances that easily dissolve in water.

With repect to the change in the oxygen tension in the coronary venous blood, the pharmacological investigation of the vasodilator action on the coronary vessels was carried out in dogs according to the methods described by W. K. A. Shaper and his co-workers (see W. K. A. Schaper, R. Xhonneux and J. M. Bogaard "Uber die kontinuierliche Messung des Sauerstoffdrucks im venösen Coronarblut," Naunyn-Schmiedeberg's Arch. exp. Path. u. Pharmak. 245, 383–389 (1963)). The test preparations were applied intravenously to the narcotized and spontaneously breathing animals. On these test conditions the dilatation of the coronary arteries caused by the test substances along with the increase in the coronary blood flow led to an increase in the oxygen tension in In the preparation of dragées and tablets containing as essential active ingredient the coumarin derivatives of our invention, these substances may be admixed with the conventional solid tabletting adjuvants, such as starch, lactose, talc and the like. Any of the tabletting materials and carriers customary in pharmaceutical practice may be employed.

For the preparation of the injection solutions the hydrochlorides of the coumarin derivatives are particularly suited since they have mostly a good water-solubility. Injection solutions of water-insoluble products may of course be prepared in the conventional manner by concurrently using well-known suspending agents, emulsifiers and/or solubilizers.

For a better understanding of the nature and the objects of this invention, reference should be made to the accompanying examples which are of an illustrative rather than a limiting nature. Unless otherwise stated, all temperatures given are in degrees centigrade.

EXAMPLE 1

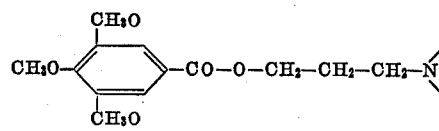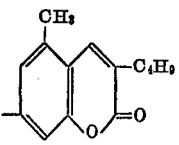

47.5 g. (0.1 mol) 3-n-butyl-4-methyl-7-{β-[4'-(γ-hydroxypropyl)-piperazino[1']]-ethoxy}-coumarin dihydrochloride are suspended in 500 cc. anhydrous benzene. After the addition of 30.3 g. (0.3 mol) triethylamine, a solution of 23 g. (0.1 mol) 3,4,5-trimethoxybenzoyl chloride in 100 cc. anhydrous benzene is added dropwise with stirring. Stirring is continued for 3–4 hours at room temperature and then for 1–2 hours with boiling under reflux and, while hot, separated triethylamine hydrochloride is filtered off with suction. The filtrate is washed with water, a 10% aqueous sodium hydrogen carbonate solution and again with water. The benzene solution so purified is dried over anhydrous sodium sulfate and evaporated to dryness at 50° in the water-jet vacuum. The residue, a viscous, light yellow oil, is dissolved in 1,000 cc. anhydrous diethyl ether, the ethereal solution is filtered and the dihydrochloride of the 3-n-buty-4-methyl-7-{β-[4'-(γ-3'',4'',5'' - trimethoxy-benzoxypropyl) - piperazino[1']]-ethoxy}-coumarin is precipitated with ethereal hydrochloric acid. This dihydrochloride is obtained in the form of colorless crystals decomposing at 235–237°.

Yield: 52–54 g.=77–80% of the theoretical.

The 3-n-butyl-4-methyl-7-{β-[4' - (γ-hydroxy-propyl)-piperazino[1]]-ethoxy}-coumarin used as starting material can be prepared as follows:

(a) 23.2 g. (0.1 mol) 3-n-butyl-4-methyl-7-hydroxycoumarin are dissolved in 280 cc. dimethyl sulfoxide and admixed with 11.2 g. (0.1 mol) potassium-tertiary-butylate. This solution is stirred at 40° for 15 minutes. With stirring, 25 g. (0.106 mol) β-chloroethyl p-toluene-sulfonate are allowed to drop into the solution. Subsequently, stirring is done at 40° for 10 hours and the reaction mixture is poured into water. The crude product precipitating in the form of an oil is dissolved in ethyl acetate and, for further purification, washed with dilute caustic soda solution and dried. After evaporating the ethyl acetate solution to dryness, the 3-n-butyl-4-methyl-7-β-chloro-ethoxy-coumarin is obtained in the form of white crystals melting at 80–81°.

Yield: 23 g.=78% of the theoretical.

Analogously, 4-methyl-7 - β - chloro-ethoxy-coumarin melting at 117–118° and 3-β-diethylamino-ethyl-4-methyl-7-β-chloro-ethoxy-coumarin melting at 106° are obtained.

(b) 29.4 g. (0.1 mol) 3-n-butyl-4-methyl-7-β-chloro-ethoxy-coumarin and 14.4 g. (0.1 mol) N-(γ-hydroxypropyl)piperazine are dissolved in 150 cc. chloro benzene, 10.6 g. (0.1 mol) anhydrous sodium carbonate are added and the reaction mixture is then stirred at 120° for 12 hours. After cooling down, separated sodium chloride is filtered off with suction. The filtrate is evaporated to dryness in the water-jet vacuum and the remaining crude product is dissolved in ethyl acetate, washed with water and dried over potassium carbonate. After the addition of ethereal hydrochloric acid, the reaction product precipitates in the form of white needles. Thus, the dihydrochloride of the 3-n-butyl-4-methyl-7-{β-[4'-(γ-hydroxypropyl) - piperazino[1']]-ethoxy}-coumarin is obtained having a melting point of 251–253°.

Yield: 32 g.=67.4% of the theoretical.

Analogously, the intermediates of the following general formula can be prepared:

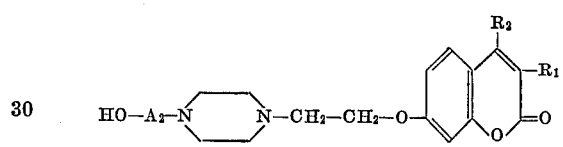

| $R_1$ | $R_2$ | $A_2$ | Melting point of the dihydrochloride, ° |
|---|---|---|---|
| H | $CH_3$ | $-CH_2-CH_2$ | 248–252 |
| H | $CH_3$ | $-CH_2-CH_2-CH_2-$ | 230–231 |
| H | $CH_3$ | $-CH_2-CH(CH_3)-$ | 240–241 |
| $C_4H_9$ | $CH_3$ | $-CH_2-CH_2-$ | 246–250 |
| $C_4H_9$ | $CH_3$ | $-CH_2-CH(CH_3)-$ | 226–228 |

| $R_1$ | $R_2$ | $A_2$ | Melting point of the trihydrochloride, ° |
|---|---|---|---|
| $(C_2H_5)_2NCH_2CH_2$ | $CH_3$ | $-CH_2-CH_2-$ | 164–168 |
| $(C_2H_5)_2NCH_2CH_2$ | $CH_3$ | $-CH_2-CH_2-CH_2-$ | 240–242 |
| $(C_2H_5)_2NCH_2CH_2$ | $CH_3$ | $-CH_2-CH(CH_3)-$ | 188–191 |

Analogously to the description given in the 1st paragraph of the present example, the following compounds of the present invention can be prepared from the before-mentioned intermediates:

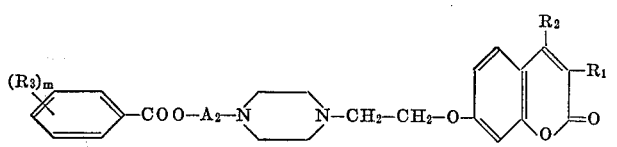

| $R_1$ | $R_2$ | $A_2$ | $(R_3)_m$ | Melting or decomposition point of the dihydrochloride, ° |
|---|---|---|---|---|
| H | $CH_3$ | $-CH_2-CH_2$ | 3,4,5-$(OCH_3)_3$ | 206–207 |
| H | $CH_3$ | $-CH_2-CH_2-CH_2-$ | 3,4,5-$(OCH_3)_3$ | 227–228 |
| H | $CH_3$ | $-CH_2-CH(CH_3)-$ | 3,4,5-$(OCH_3)_3$ | 228–229 |
| $C_4H_9$ | $CH_3$ | $-CH_2-CH_2-$ | 3,4,5-$(OCH_3)_3$ | 213 |
| $C_4H_9$ | $CH_3$ | $-CH_2-CH(CH_3)-$ | 3,4,5-$(OCH_3)_3$ | 221 |

| $R_1$ | $R_2$ | $A_2$ | $(R_3)_m$ | Melting point of the trihydrochloride, ° |
|---|---|---|---|---|
| $(C_2H_5)_2NCH_2CH_2$ | $CH_3$ | $-CH_2-CH_2-$ | 3,4,5-$(OCH_3)_3$ | 227 |
| $(C_2H_5)_2NCH_2CH_2$ | $CH_3$ | $-CH_2-CH_2-CH_2-$ | 3,4,5-$(OCH_3)_3$ | 235 |
| $(C_2H_5)_2NCH_2CH_2$ | $CH_3$ | $-CH_2-CH(CH_3)-$ | 3,4,5-$(OCH_3)_3$ | 228 |

EXAMPLE 2

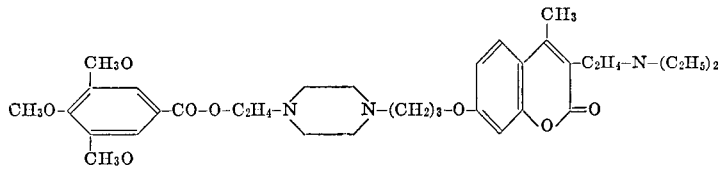

44.5 g. (0.1 mol) 3-β-diethylamino-ethyl-4-methyl-7-{γ-[4' - (β-hydroxy-ethyl)-piperazino[1']]-propoxy}-coumarin are dissolved in 500 cc. anhydrous ethyl acetate and 10.1 g. (0.1 mol) triethylamine are added. Within one hour, 23 g. (0.1 mol) 3,4,5-trimethoxybenzoyl chloride dissolved in 100 cc. anhydrous ethyl acetate are added dropwise with stirring. Then, stirring is continued for 5 hours at room temperature, then for 2 hours under reflux. After cooling down, the solution is admixed with water, the ethyl acetate layer is separated and washed with water, a 5% aqueous sodium hydrogen carbonate solution and again with water. After the ethyl acetate solution has been dried over anhydrous sodium sulfate, anhydrous hydrogen chloride is introduced with ice-cooling, until the precipitation is completed. Thus, the trihydrochloride of the 3 - β - diethylamino-ethyl-4-methyl-7-{γ-[4'-(β-3'',4'',5''-trimethoxybenzoxyethyl) - piperazino[1']]-propoxy}-coumarin is obtained in the form of colorless crystals decomposing at 142°.

Yield: 54 g.=72% of the theoretical.

The 3 - β - diethylamino-ethyl-4-methyl-7-{γ-[4'-(β-hydroxy-ethyl) - piperazino[1']]-propoxy}-coumarin required as starting material can be prepared as follows:

(a) 31.15 g. (0.1 mol) 3 - β - diethylamino-ethyl-4-methyl-7-hydroxy-coumarin hydrochloride are dissolved in 150 cc. dimethyl sulfoxide, 11.2 g. (0.1 mol) potassium-tertiary-butylate are added and the solution is stirred at 40–50° for 30 minutes. Then 17.3 g. (0.11 mol) 1-bromo-3-chloro propane are added dropwise with stirring. Subsequently, the reaction mixture is stirred at 40° for 15 hours and, after cooling down, it is poured in five times its volume of water. For purification purposes, the crude product precipitating in the form of an oil is dissolved in ethyl acetate. The ethyl acetate solution is washed with a dilute caustic soda solution, dried over potassium carbonate and evaporated to dryness under reduced pressure. The residue is recrystallized from petroleum ether. Thus, the 3 - β - diethylamino-ethyl-4-methyl-7-γ-chloro-propoxy-coumarin is obtained in the form of colorless crystals melting at 59–61°.

Yield: 19 g.=54% of the theoretical.

Analogously, the following products are prepared:

| | Melting point, ° |
|---|---|
| 3 - n - butyl-4-methyl-7-γ-chloro-propoxy-coumarin | 55–57 |
| 3 - n - butyl-4-n-propyl-7-γ-chloro-propoxy-coumarin | 56–58 |
| 3 - ethyl - 4 - phenyl-7-γ-chloro-propoxy-coumarin | 85–86 |
| 3 - allyl - 4 - methyl-7-γ-chloro-propoxy-coumarin | 39–41 |
| 3 - β - piperidino-ethyl-4-n-propyl-7-γ-chloro-propoxy-coumarin hydrochloride | 218–219 |

(b) 35.1 g. (0.1 mol) 3-β-diethylamino-ethyl-4-methyl-7-γ-chloro-propoxy-coumarin and 13 g. (0.1 mol) N-(β-hydroxy-ethyl)piperazine are dissolved in 180 cc. chloro benzene, 10.6 g. (0.1 mol) anhydrous sodium carbonate are added and the reaction mixture is stirred at 110–120° for 12 hours. After cooling down, the reaction mixture is filtered off with suction from separated sodium chloride and the filtrate is evaporated to dryness in the vacuum. The resulting residue is recrystallized from diethyl ether for purification. Thus, 3-β-diethylamino-ethyl-4-methyl-7-{γ-[4'-(β-hydroxy-ethyl) - piperazino[1']]-propoxy}-coumarin is obtained having a melting point of 70–71°.

Yield: 31 g.=69.7% of the theoretical.

Analogously, the following intermediates can be prepared:

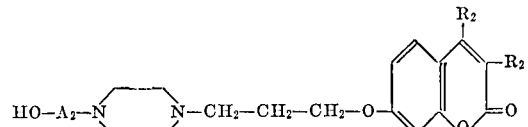

| $R_1$ | $R_2$ | $A_2$ | Melting Point, ° |
|---|---|---|---|
| $(C_2H_5)_2$—NCH$_2$—CH$_2$—CH$_3$ | CH$_3$ | —CH$_2$—CH$_2$—CH$_2$— | 67–69 |
| n-C$_4$H$_9$ | CH$_3$ | —CH$_2$—CH$_2$—CH$_2$— | 75–77 |
| n-C$_4$H$_9$ | CH$_3$ | —CH$_2$—CH(CH$_3$)— | 64–67 |
| n-C$_4$H$_9$ | CH$_3$ | —CH$_2$—CH$_2$—CH$_2$—CH$_2$— | 80–81 |
| n-C$_4$H$_9$ | n-C$_3$H$_7$ | —CH$_2$—CH$_2$—CH$_2$— | 47–48 |
| CH$_2$=CH—CH$_2$— | CH$_3$ | —CH$_2$—CH$_2$— | 51–53 |
| CH$_2$=CH—CH$_2$— | CH$_3$ | —CH$_2$—CH$_2$—CH$_2$— | 53–56 |
| CH$_2$=CH—CH$_2$— | CH$_3$ | —CH$_2$—CH(CH$_3$)— | 92–93 |
| CH$_2$=CH—CH$_2$— | CH$_3$ | —CH$_2$—CH$_2$—CH$_2$—CH$_2$— | 68–69 |

| | | | Melting Point of the dihydrochloride, ° |
|---|---|---|---|
| n-C$_4$H$_9$ | n-C$_3$H$_7$ | —CH$_2$—CH$_2$— | 244–246 |
| n-C$_4$H$_9$ | n-C$_3$H$_7$ | —CH$_2$—CH(CH$_3$)— | [1] 215–217 |
| n-C$_4$H$_9$ | n-C$_3$H$_7$ | —CH$_2$—CH$_2$—CH$_2$—CH$_2$— | 220–221 |
| C$_2$H$_5$ | C$_6$H$_5$ | —CH$_2$—CH$_2$— | 235–236 |
| C$_2$H$_5$ | C$_6$H$_5$ | —CH$_2$—CH$_2$—CH$_2$— | 239–241 |
| C$_2$H$_5$ | C$_6$H$_5$ | —CH$_2$—CH(CH$_3$)— | 231–233 |

Footnotes at end of table.

TABLE.—Continued

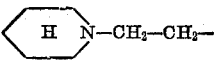

| $R_1$ | $R_2$ | $A_2$ | Melting Point of the trihydrochloride, ° |
|---|---|---|---|
| $(C_2H_5)_2-NCH_2-CH_2-$ | $CH_3$ | $-CH_2-CH(CH_3)-$ | 234–236 |
| H N—CH₂—CH₂— | $n-C_3H_7$ | $-CH_2-CH_2-$ | [1] 250–254 |
| Same as above | $n-C_3H_7$ | $-CH_2-CH_2-CH_2-$ | [2] |
| Do | $n-C_3H_7$ | $-CH_2-CH_2-CH_2-CH_2-$ | [3] |

[1] With decomp.
[2] Starting from 60° with decomp.
[3] Starting from 135° with decomp.

Analogously to the description given in the 1st paragraph of the present example, the following compounds under the present invention can be prepared:

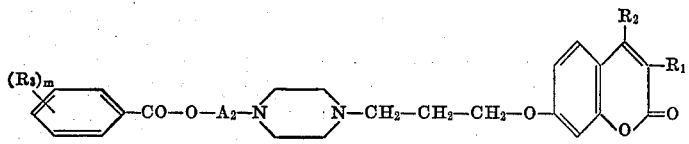

| $R_1$ | $R_2$ | $A_1$ | $(R_3)_m$ | Melting Point of the trihydrochloride,° |
|---|---|---|---|---|
| $(C_2H_5)_2-N-C_2H_4$ | $CH_3$ | $-CH_2-CH_2-CH_2-$ | $3,4,5(OCH_3)_3$ | [1] 120 |
| $(C_2H_5)_2-N-C_2H_4$ | $CH_3$ | $-CH_2-CH(CH_3)-$ | $3,4,5(OCH_3)_3$ | [1] 130 |
| H N—CH₂—CH₂ | $n-C_3H_7$ | $-CH_2-CH_2-$ | $3,4,5(OCH_3)_3$ | [1] 128 |
| Same as above | $n-C_3H_7$ | $-CH_2-CH_2-CH_2-$ | $3,4,5(OCH_3)_3$ | [1] 115 |
| Do | $n-C_3H_7$ | $-CH_2-CH_2-CH_2-CH_2-$ | $3,4,5(OCH_3)_3$ | [1] 120 |

| $R_1$ | $R_2$ | $A_1$ | $(R_3)_m$ | Melting Point of the dihydrochloride, ° |
|---|---|---|---|---|
| $n-C_4H_9$ | $CH_3$ | $-CH_2-CH_2-CH_2-$ | $3,4,5(OCH_3)_3$ | 214–216 |
| $n-C_4H_9$ | $CH_3$ | $-CH_2-CH(CH_3)-$ | $3,4,5(OCH_3)_3$ | [1] 152 |
| $n-C_4H_9$ | $CH_3$ | $-CH_2-CH_2-CH_2-CH_2-$ | $3,4,5(OCH_3)_3$ | 228–230 |
| $n-C_4H_9$ | $n-C_3H_7$ | $-CH_2-CH_2-$ | $3,4,5(OCH_3)_3$ | 209–211 |
| $n-C_4H_9$ | $n-C_3H_7$ | $-CH_2-CH_2-CH_2-$ | $3,4,5(OCH_3)_3$ | 200–202 |
| $n-C_4H_9$ | $n-C_3H_7$ | $-CH_2-CH(CH_3)-$ | $3,4,5(OCH_3)_3$ | [1] 177 |
| $n-C_4H_9$ | $n-C_3H_7$ | $-CH_2-CH_2-CH_2-CH_2-$ | $3,4,5(OCH_3)_3$ | 219–221 |
| $C_2H_5$ | $C_6H_5$ | $-CH_2-CH_2-$ | $3,4,5(OCH_3)_3$ | 209 |
| $C_2H_5$ | $C_6H_5$ | $-CH_2-CH_2-CH_2-$ | $3,4,5(OCH_3)_3$ | 225–227 |
| $C_2H_5$ | $C_6H_5$ | $-CH_2-CH(CH_3)-$ | $3,4,5(OCH_3)_3$ | [1] 145 |
| $CH_2=CH-CH_2-$ | $CH_3$ | $-CH_2-CH_2-$ | $3,4,5(OCH_3)_3$ | 211–213 |
| $CH_2=CH-CH_2-$ | $CH_3$ | $-CH_2-CH_2-CH_2-$ | $3,4,5(OCH_3)_3$ | 229–231 |
| $CH_2=CH-CH_2-$ | $CH_3$ | $-CH_2-CH(CH_3)-$ | $3,4,5(OCH_3)_3$ | [1] 125 |
| $CH_2=CH-CH_2-$ | $CH_3$ | $-CH_2-CH_2-CH_2-CH_2-$ | $3,4,5(OCH_3)_3$ | 212–213 |

[1] With decomp.

EXAMPLE 3

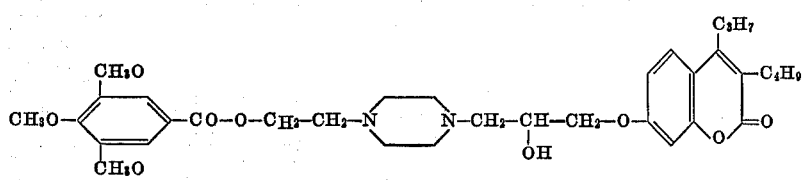

44.6 g. (0.1 mol) 3 - n-butyl-4-n-propyl-7-{γ-[4'-(β-hydroxy-ethyl)-piperazino[1']] - β - hydroxy-propoxy}-coumarin are dissolved in 300 cc. anhydrous chloroform and 10.1 g. (0.1 mol) triethylamine are added. Within 1 hour, 23 g. (0.1 mol) 3,4,5-trimethoxybenzoyl chloride dissolved in 100 cc. anhydrous chloroform are added dropwise with stirring.

After the exothermic reaction has decayed, the reaction mixture is stirred at 40–50° for another 2 hours. After cooling down, it is admixed with water, the chloroform phase is separated and washed with water, a 5% sodium hydrogen carbonate solution and again with water. The chloroform solution is dried over anhydrous sodium sulfate, the solvent is then distilled off at 50° in the water-jet vacuum and the residue is dissolved in dilute aqueous hydrochloric acid. For purification, the aqueous hydrochloric solution is washed with ethyl acetate, then rendered alkaline with potassium carbonate (pH 9). The reaction product which has precipitated in the form of an oil is extracted with ethyl acetate. The ethyl acetate solution is dried over anhydrous sodium sulfate, freed from the solvent under reduced pressure and the residue is dissolved in about 100 cc. anhydrous methanol. By adding methanolic hydrochloric acid, the dihydrochloride of the 3 - n - butyl-4-n-propyl-7-{γ-[4'-(β-3''',4'',5''-trimethoxy-benzoxyethyl)-piperazino[1']] - β - hydroxy-propoxy}-coumarin in the form of colorless crystals decomposing at 235° is obtained.

Yield: 50 g.=70% of the theoretical.

The 3 - n - butyl-4-n-propyl-7-{γ-[4'-(β-hydroxy-ethyl)-piperazino[1']] - β -hydroxy-propoxy}-coumarin required as starting material can be prepared as follows:

(a) 26 g. (0.1 mol) 3-n-butyl-4-n-propyl-7-hydroxy-coumarin are dissolved in 150 cc. dimethyl formamide, 11.2 g. (0.1 mol) potassium-tertiary-butylate are added and the solution is stirred at room temperature for 30 minutes. With stirring, 46.3 g. (0.5 mol) epichlorohydrin are run at once into the solution. After 5 hours' stirring at room temperature, the reaction mixture is poured into water. The reaction product separating first in the form of an oil, is dissolved in ethyl acetate and the mixture is washed with dilute caustic soda solution. After having dried the ethyl acetate layer over potassium carbonate, it is evaporated to dryness under reduced pressure. For purification purposes the residue is recrystallized from petroleum ether. The 3-n-butyl-4-n-propyl-7-(2',3'-epoxy-propoxy)-coumarin is obtained in the form of colorless crystal needles melting at 102–103°.

Yield: 23 g.=73% of the theoretical.

Analogously, the following compounds can be prepared:

|  | Melting point, ° |
|---|---|
| 4-methyl-7-(2',3'-epoxy-propoxy)-coumarin | 119–122 |
| 4-phenyl-7-(2',3'-epoxy-propoxy)-coumarin | 121–122 |
| 3-n-butyl-4-methyl-7-(2',3'-epoxy-propoxy)-coumarin | 104–105 |
| 3-ethyl-4-phenyl-7-(2',3'-epoxy-propoxy)-coumarin | 92–94 |
| 3-allyl-4-methyl-7-(2',3'-epoxy-propoxy)-coumarin | 125–127 |
| 3-β-diethylamino-ethyl-4-methyl-7-(2',3'-epoxy-propoxy)-coumarin | 75–77 |
| 3-β-piperidino-ethyl-4-n-propyl-7-(2',3'-epoxy-propoxy)-coumarin | 83–86 |

(b) 31.6 g. (0.1 mol) 3-n-butyl-4-n-propyl-7-(2',3'-epoxy-propoxy)-coumarin are dissolved in 200 cc. ethanol, 39 g. (0.3 mol) N-(β-hydroxy-ethyl) piperazine are added and the mixture is boiled under reflux for 10 hours. The reaction mixture is then concentrated in the water-jet vacuum and the remaining excess N-(β-hydroxyethyl) piperazine is disilled off in the oil pump vacuum. The resulting residue is dissolved in little ethyl acetate. After having allowed the solution to stand for a while, the reaction production crystallizes out in the form of colorless needles. The 3-n-butyl-4-n-propyl-7-{γ-[4'-(β-hydroxy - ethyl) - piperazino[1']] - β - hydroxy - propoxy}-coumarin melting at 90–92° is obtained.

The intermediates having the following general formula can be prepared analogously:

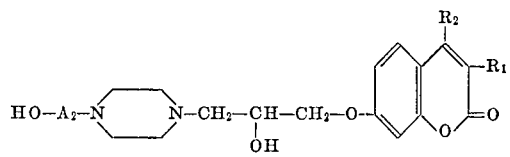

| R₁ | R₂ | A₂ | Melting Point, ° |
|---|---|---|---|
| H | CH₃ | —CH₂—CH₂— | 123–125 |
| H | CH₃ | —CH₂—CH(CH₃)— | 120–121 |
| H | C₆H₅ | —CH₂—CH₂— | 105–107 |
| n-C₄H₉ | CH₃ | —CH₂—CH₂— | 109–112 |
| n-C₄H₉ | CH₃ | —CH₂—CH₂—CH₂— | 105–107 |
| n-C₄H₉ | CH₃ | —CH₂—CH(CH₃)— | 106–108 |
| n-C₄H₉ | CH₃ | —CH₂—CH₂—CH₂—CH₂— | 96–98 |
| n-C₄H₉ | n-C₃H₇ | —CH₂—CH₂— | 90–92 |
| n-C₄H₉ | n-C₃H₇ | —CH₂—CH(CH₃)— | 71–73 |
| n-C₄H₉ | n-C₃H₇ | —CH₂—CH₂—CH₂—CH₂— | 66–65 |
| C₂H₅ | C₆H₅ | —CH₂—CH₂— | 128–130 |
| (C₂H₅)₂—N—CH₂—CH₂— | CH₃ | —CH₂—CH₂— | 102–105 |
| (C₂H₅)₂—N—CH₂—CH₂— | CH₃ | —CH₂—CH₂—CH₂— | 115–116 |
| (C₂H₅)₂—N—CH₂—CH₂— | CH₃ | —CH₂—CH(CH₃)— | 119–120 |

| | | | As dihydrochloride, ° |
|---|---|---|---|
| H | CH₃ | —CH₂—CH₂—CH₂— | 231–233 |
| H | CH₃ | —CH₂—CH₂—CH₂—CH₂— | 234–236 |
| H | C₆H₅ | —CH₂—CH₂—CH₂— | 226–228 |
| H | C₆H₅ | —CH₂—CH(CH₃)— | 249–250 |
| C₂H₅ | C₆H₅ | —CH₂—CH₂—CH₂— | 227–230 |
| C₂H₅ | C₆H₅ | —CH₂—CH(CH₃)— | 234–236 |
| CH₂=CH—CH₂— | CH₃ | —CH₂—CH₂— | 220–222 |
| CH₂=CH—CH₂— | CH₃ | —CH₂—CH(CH₃)— | 197–200 |
| CH₂=CH—CH₂— | CH₃ | —CH₂—CH₂—CH₂— | 218–219 |

| | | | As trihydrochloride, ° |
|---|---|---|---|
| (C₂H₅)₂—N—CH₂—CH₂— | CH₃ | —CH₂—CH₂—CH₂—CH₂— | 222–223 |
| ⟨H N⟩—CH₂—CH₂— | n-C₃H₇ | —CH₂—CH₂— | 244–246 |
| Same as above | n-C₃H₇ | —CH₂—CH₂—CH₂— | 254–256 |

EXAMPLE 4

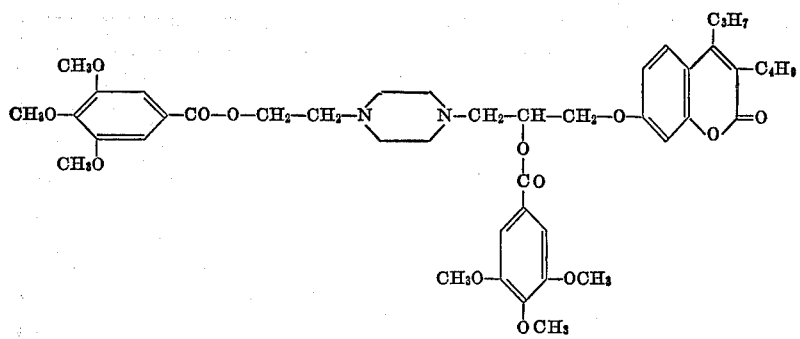

44.6 g. (0.1 mol) 3-n-butyl-4-n-propyl-7-{γ-[4'-(β-hydroxy-ethyl)-piperazino[1']]-β-hydroxy - propoxy} - coumarin are dissolved in 350 cc. anhydrous chloroform and 20.2 g. (0.2 mol) triethylamine are added. Within 2 hours, 46 g. (0.2 mol) 3,4,5-trimethoxybenzoyl chloride, dissolved in 200 cc. anhydrous chloroform, are added dropwise with stirring. After the exothermic reaction has decayed, stirring is continued at 40–50° for 2 hours, then the reaction mixture is worked up as described in Example 3.

Thus, the dihydrochloride of the diester having the above-mentioned formula is obtained in the form of colorless crystals decomposing at 160°.

Yield: 70 g.=78.5% of the theoretical.

The above diester is also obtained by reacting in chloroform the monoester described in Example 3 with 3,4,5-trimethoxybenzoyl chloride, with the addition of triethylamine.

EXAMPLE 5

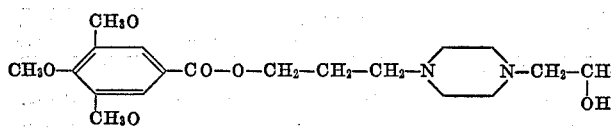 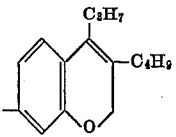

40.2 g. (0.1 mol) 3-n-butyl-4-n-propyl-7-{γ-piperazino[1']-β-hydroxy-propoxy}-coumarin are dissolved in 100 cc. anhydrous chloro benzene, 13.8 g. (0.1 mol) potassium carbonate are added and, with stirring, a solution of 29 g. (0.1 mol) γ-chloro-propyl 3,4,5,-timethoxy benzoate in 50 cc. anhydrous chloro benzene are added dropwise at 50–60° within one hour. The reaction mixture is stirred for 12 hours with heating under reflux. Then, while hot, the insolute is filtered off and the filtrate is freed from the solvent in the water-jet vacuum. After further working up as described in Example 3, the dihydrochloride of the 3-n-butyl-4-n-propyl-7-{γ-[4'-(γ-3'',4'',5''-trimethoxy-benzoxypropyl) - piperazino[1']] - β - hydroxy-propoxy}-coumarin is obtained in the form of colorless crystals decomposing at 227°.

Yield: 51 g.=70% of the theoretical.

The same product is obtained by the reaction of 1-(γ-3',4',5'-trimethoxy-benzoxypropyl)-4-(γ-chloro - β - hydroxypropyl)-piperazine, its dihydrochloride decomposing at 159°, with 3-n-butyl-4-n-propyl-7-hydroxy-coumarin melting at 118°.

The 3-n-butyl-4-n-propyl - 7 - (γ-piperazine[1¹]-β-hydroxy-propoxy)-coumarin used in the present example as starting material can be prepared as follows:

86 g. (1 mol) anhydrous, distilled piperazine are dissolved in 150 cc. chloro benzene and heated to 120°. A solution of 31.6 g. (0.1 mol) 3-n-butyl-4-n-propyl-7-(2',3'-epoxy-propoxy)-coumarin in 200 cc. chloro benzene is slowly added dropwise with stirring. Stirring is continued at 120° for 12 hours. After cooling down, separated piperazine is filtered off with suction from the reaction mixture and the filtrate is evaporated to dryness under reduced pressure. Residual and negligible quantities of excess piperazine are distilled off in the oil pump vacuum. The residue is dissolved in methylene chloride, the solution is washed with little water, dried and slightly concentrated. After having allowed the mixture to stand for a while, the 3-n-butyl-4-n - propyl-7-(γ-piperazino[1']-β-hydroxy-propoxy)-coumarin crystallizes out in the form of colorless needles melting at 78°.

Yield: 22 g.=54.7% of the theoretical.

Analogously to the description given in Examples 3 and 4 as well as in the present example, the following compounds can be prepared according to the present invention:

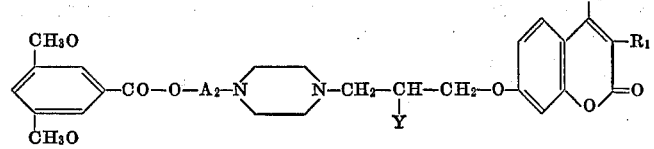

| R₁ | R₂ | Y | A₂ | Melting or decomposition point of the dihydrochloride, ° |
|---|---|---|---|---|
| H | CH₃ | OH | —CH₂—CH₂— | 245 |
| H | CH₃ | OH | —CH₂—CH₂—CH₂— | 248 |
| H | CH₃ | OH | —CH₂—CH₂—CH₂—CH₂— | 236 |
| H | C₆H₅ | OH | —CH₂—CH₂— | 170 |
| H | C₆H₅ | OH | —CH₂—CH₂—CH₂— | 214 |
| H | C₆H₅ | OH | —CH)CH₃(—CH₂— | 249 |
| n-C₄H₉ | CH₃ | OH | —CH₂—CH₂— | 220 |
| n-C₄H₉ | CH₃ | OH | —CH₂—CH₂—CH₂— | 225 |
| n-C₄H₉ | CH₃ | OH | —CH₂—CH₂—CH₂—CH₂— | 218 |
| n-C₄H₉ | n-C₃H₇ | OH | —CH₂—CH₂—CH₂—CH₂— | 210 |
| C₂H₅ | C₆H₅ | OH | —CH₂—CH₂— | 221 |
| C₂H₅ | C₆H₅ | OH | —CH₂—CH₂—CH₂— | 225 |
| CH₂=CH—CH₂— | CH₃ | OH | —CH₂—CH₂— | 215 |
| CH₂=CH—CH₂— | CH₃ | OH | —CH₂—CH₂—CH₂— | 217 |

3,541,097

TABLE.—Continued

| R₁ | R₂ | A₂ | Y | Melting or point of the decomposition dihydrochloride, ° |
|---|---|---|---|---|
| H | CH₃ | —O—CO—C₆H₂(OCH₃)₃ | —CH₂—CH₂— | 170 |
| H | CH₃ | Same as above | —CH(CH₃)—CH₂— | 164 |
| H | C₆H₅ | ...do... | —CH₂—CH₂— | 140 |
| H | C₆H₅ | ...do... | —CH₂—CH₂—CH₂— | 144 |
| H | C₆H₅ | ...do... | —CH(CH₃)—CH₂— | 130 |
| n-C₄H₉ | CH₃ | ...do... | —CH₂—CH₂— | 130 |
| n-C₄H₉ | CH₃ | ...do... | —CH(CH₃)—CH₂— | 135 |
| n-C₄H₉ | CH₃ | ...do... | —CH₂—CH₂—CH₂—CH₂— | 98 |
| n-C₄H₉ | n-C₃H₇ | ...do... | —CH₂—CH₂—CH₂— | 150 |
| C₂H₅ | C₆H₅ | ...do... | —CH₂—CH₂— | 130 |
| C₂H₅ | C₆H₅ | ...do... | —CH₂—CH₂—CH₂— | 133 |
| C₂H₅ | C₆H₅ | ...do... | —CH(CH₃)—CH₂— | 124 |
| CH₂=CH—CH₂— | CH₃ | ...do... | —CH₂—CH₂— | 140 |
| CH₂=CH—CH₂— | CH₃ | ...do... | —CH₂—CH₂—CH₂— | 143 |
| CH₂=CH—CH₂— | CH₃ | ...do... | —CH(CH₃)—CH₂— | 145 |

| | | | | Melting point of the trihydrochloride, ° |
|---|---|---|---|---|
| (C₂H₅)₂N—CH₂—CH₂— | CH₃ | ...do... | —CH₂—CH₂— | 130 |
| (C₂H₅)₂N—CH₂—CH₂— | CH₃ | ...do... | —CH₂—CH₂—CH₂— | 132 |
| (C₂H₅)₂N—CH₂—CH₂— | CH₃ | ...do... | —CH(CH₃)—CH₂— | 138 |
| (C₂H₅)₂N—CH₂—CH₂— | CH₃ | ...do... | —CH₂—CH₂—CH₂—CH₂— | 131 |
| piperidino—CH₂—CH₂— | n-C₃H₇ | ...do... | —CH₂—CH₂— | 148 |
| Same as above | n-C₃H₇ | ...do... | —CH₂—CH₂—CH₂— | 155 |

| | | | | Melting point of the dihydrochloride, ° |
|---|---|---|---|---|
| n-C₄H₉ | n-C₃H₇ | ...do... | —CH(CH₃)—CH₂— | 149 |
| n-C₄H₉ | n-C₃H₇ | ...do... | —CH₂—CH₂—CH₂—CH₂— | 154 |

What is claimed is:

1. A coumarin derivative bearing having the formula

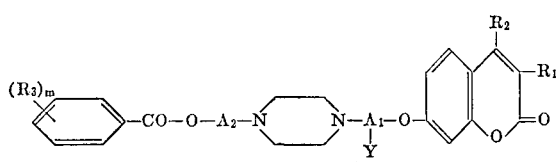

wherein R₁ stands for hydrogen, lower alkyl, allyl, dialkylaminoalkyl where the alkyl contains 1-4 carbon atoms, and whereby the alkyl groups attached to the nitrogen may form a piperidine ring, R₂ stands for hydrogen, lower alkyl or phenyl, R₃ stands for lower alkoxy where the alkyl contains 1-4 carbon atoms, m represents the integers 1, 2 or 3, and A₁ and A₂ are straight or branched alkylene residues having 2-4 carbon atoms, and Y is hydrogen, a hydroxy group or the residue

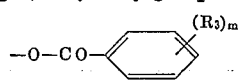

or the hydrochloride of said coumarin derivative.

2. A coumarin derivative as set forth in claim 1 wherein R₁ is selected from the group consisting of hydrogen, alkyl having 1-4 carbon atoms, allyl, diethylaminoethyl and piperidinoethyl, R₂ stands for alkyl having 1-3 carbon atoms or phenyl, R₃ stands for methoxy in 3, 4, 5-position, $$\overset{A_1}{\underset{Y}{\downarrow}}$$

is ethylene or propylene, and A₂ is ethylene, n-propylene, isopropylene or n-butylene, or the hydrochloride of said coumarin derivative.

3. A coumarin derivative as set forth in claim 1 wherein R₁ is selected from the group consisting of hydrogen, alkyl having 1-4 carbon atoms, allyl, diethylaminoethyl or piperidinoethyl, R₂ stands for alkyl having 1-3 carbon atoms or phenyl, R₃ stands for methoxy in 3, 4, 5-position, $$\overset{A_1}{\underset{Y}{\downarrow}}$$

is —CH₂—CHOH—CH₂— an A₂ is ethylene, n-propylene, isopropylene or n-butylene, or the hydrochloride of said coumarin derivatives.

4. A coumarin derivative as set forth in claim 1 wherein R₁ is selected from the group consisting of hydrogen, alkyl having 1-4 carbon atoms, allyl, diethylaminoethyl or piperidinoethyl, R₂ stands for alkyl having 1-3 carbon atoms or phenyl, R₃ stands for methoxy in 3, 4, 5-position, $$\overset{A_1}{\underset{Y}{\downarrow}}$$

is

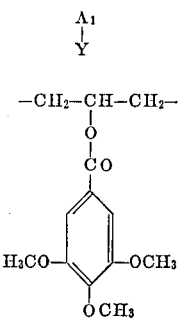

and A₂ is ethylene, n-propylene, isopropylene or n-butylene, or the hydrochlorides of said coumarin derivatives.

5. 4 - methyl - 7 - {β-[4'-(γ-3'',4'',5'' - trimethoxybenzoxypropyl)-piperazino[1']]-ethoxy} - coumarin, or the hydrochloride of said coumarin derivative.

6. 4-methyl - 7 - {β-[4'-(β-3'',4'',5'' - trimethoxybenzoxypropyl)-piperazino[1']]-ethoxy}-coumarin, or the hydrochloride of said coumarin derivative.

7. 3 - ethyl-4-phenyl-7-{γ-[4'-(β-3'',4'',5''-trimethoxybenzoxyethyl) - piperazino[1']]-propoxy}-coumarin, or the hydrochloride of said coumarin derivative.

8. 3-allyl - 4-methyl-7-{γ-[4'-(β-3'',4'',5''-trimethoxybenzoxyethyl)-piperazino - [1']]-β-3'',4'',5''-trimethoxybenzoxypropoxy}-coumarin, or the hydrochloride of said coumarin derivative.

9. 3 - β - N-piperidinoethyl-4-n-propyl-7-{γ-[4'-(β-3'', 4'',5'' - trimethoxybenzoxyethyl)-piperazino[1']] - β-3'', 4'',5''-trimethoxybenzoxypropoxy}-coumarin, or the hydrochloride of said coumarin derivative.

References Cited

Morrison et al., "Organic Chemistry," 1959, p. 483.

ALEX MAZEL, Primary Examiner

R. V. RUSH, Assistant Examiner

U.S. Cl. X.R.

260—343.2; 424—250